(12) United States Patent
Liu et al.

(10) Patent No.: US 10,778,971 B2
(45) Date of Patent: Sep. 15, 2020

(54) METHOD AND APPARATUS FOR VIDEO CODING

(71) Applicant: Tencent America LLC, Palo Alto, CA (US)

(72) Inventors: Shan Liu, San Jose, CA (US); Stephan Wenger, Hillsborough, CA (US); Xin Zhao, San Diego, CA (US); Xiang Li, San Diego, CA (US); Liang Zhao, Sunnyvale, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/147,284

(22) Filed: Sep. 28, 2018

(65) Prior Publication Data

US 2019/0373257 A1 Dec. 5, 2019

Related U.S. Application Data

(60) Provisional application No. 62/679,664, filed on Jun. 1, 2018.

(51) Int. Cl.
*H04N 19/11* (2014.01)
*H04N 19/70* (2014.01)
*H04N 19/176* (2014.01)
*H04N 19/184* (2014.01)

(52) U.S. Cl.
CPC .......... *H04N 19/11* (2014.11); *H04N 19/176* (2014.11); *H04N 19/184* (2014.11); *H04N 19/70* (2014.11)

(58) Field of Classification Search
CPC .... H04N 19/11; H04N 19/176; H04N 19/184; H04N 19/70
See application file for complete search history.

(56) References Cited

U.S. PATENT DOCUMENTS

| 8,526,495 | B2 | 9/2013 | Liu et al. |
| 9,049,452 | B2 | 6/2015 | Liu et al. |
| 9,363,511 | B2 | 6/2016 | Zhang et al. |
| 9,510,012 | B2 | 11/2016 | Liu et al. |

(Continued)

OTHER PUBLICATIONS

"High efficiency video coding", Recommendation ITU-T H.265 V4, International Telecommunication Union, Dec. 2016, 662 Pages.

(Continued)

*Primary Examiner* — Dave Czekaj
*Assistant Examiner* — Berteau Joisil
(74) *Attorney, Agent, or Firm* — Oblon, McClelland, Maier & Neustadt, L.L.P.

(57) ABSTRACT

Aspects of the disclosure provide methods and an apparatus for video decoding. In some embodiments, the apparatus for video decoding includes processing circuitry. The processing circuitry decodes at least one syntax element from a coded video bitstream. The at least one syntax element is indicative of a block size of a non-square block under reconstruction that has a rectangular shape. The block size includes a first size in a first dimension and a second size in a second dimension. The first size is different from the second size. The processing circuitry predicts a sample of the non-square block based on a first set of intra prediction directions for the non-square block. The first set of intra prediction directions does not include at least one of a second set of intra prediction directions for a square block.

21 Claims, 13 Drawing Sheets

(56) References Cited

U.S. PATENT DOCUMENTS

| | | | |
|---|---|---|---|
| 9,769,472 B2 | 9/2017 | Liu et al. | |
| 9,813,726 B2 | 11/2017 | Liu et al. | |
| 2013/0003824 A1* | 1/2013 | Guo | H04N 19/176 375/240.03 |
| 2014/0140404 A1* | 5/2014 | Liu | H04N 19/105 375/240.12 |
| 2016/0044310 A1* | 2/2016 | Park | H04N 19/176 375/240.12 |
| 2017/0272745 A1* | 9/2017 | Liu | H04N 19/159 |
| 2017/0353730 A1 | 12/2017 | Liu et al. | |

OTHER PUBLICATIONS

Rickard Sjöberg, et al., "Description of SDR and HDR video coding technology proposal by Ericsson and Nokia", JVET-J0012-v1, Joint Video Exploration Team (JVET) of ITU-T SG 16 WP 3 and ISO/IEC JTC 1/SC 29/WG 11, 10th Meeting: San Diego, CA, USA, Apr. 10-20, 2018, 32 Pages.

Ximin Zhang, et al., "Intra Mode Coding in HEVC Standard", MediaTek USA Inc,, Visual Communications and Image Processing (VCIP), IEEE, 2012, 6 Pages.

Shan Liu, et al., "Rectangular Partitioning for Intra Prediction in HEVC", MediaTek USA Inc., Visual Communications and Image Processing (VCIP), IEEE, Jan. 2012., 6 Pages.

Ximin Zhang, et al.,"Non-CE6: Intra mode coding with fixed length binarization", MediaTek USA Inc, Joint Collaborative Team on Video Coding (JCT-VC) of ITU-T SG16 WP3 and ISO/IEC JTC1/SC29/WG11, 8th Meeting, San Jose, Feb. 1-10, 2012, JCTVC-H0435, pp. 1-5.

Shan Liu, et al., "Rectangular (2NxN and Nx2N) Intra Prediction", JCTVC-G0135, Joint Collaborative Team on Video Coding (JCTVC) of ITU-T SG 16 WP 3 and ISO/IEC JTC1/SC 29/WG11, $7^{th}$ Meeting, Geneva, Nov. 21-30, 2011, 6 Pages.

PCT International Search Report with PCT Written Opinion of the International Searching Authority dated Jul. 3, 2019 in PCT/US2019/034357—9 pages.

* cited by examiner

METHOD AND APPARATUS FOR VIDEO CODING

INCORPORATION BY REFERENCE

This present disclosure claims the benefit of priority to U.S. Provisional Application No. 62/679,664, filed on Jun. 1, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In Intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used in as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer bits are required at a given quantization step size to represent the block after entropy coding.

Traditional intra coding such as known from, for example MPEG-2 generation coding technologies does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), benchmark set (BMS). A predictor block can be formed using neighboring samples values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from H.265's 33 possible predictor directions. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower right of sample (101), in a 22.5 degree angle from the horizontal.

Still referring to FIG. 1, on the top left there is depicted a square block (104) of 4×4 samples (indicated by a dashed, boldface line). The square block (104) includes 16 samples, each labelled with an "S", its position in Y dimension (e.g., row index) and its position in X dimension (e.g., column index). For example, a sample S21 is the second sample in Y dimensions (from the top) and the first (from the left) sample in X dimension. Similarly, a sample S44 is the fourth sample in the block (104) in both Y and X dimension. As the block (104) is 4×4 samples in size, the sample S44 is at the bottom right. Further shown are reference samples, that follow a similar numbering scheme. A reference sample is labelled with an R, its Y position (e.g., row index) and X position (column index) relative to the block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from prediction sample or samples to the upper right, at a 45 degree angle from the horizontal. In that case, samples S41, S32, S23, and S14 are predicted from same R05. Sample S44 is then predicted from R08.

In certain cases, the values of multiple reference samples may be combined, for example through interpolation, in order to calculate a reference sample; especially when the directions are not evenly divisible by 45 degrees.

The number of possible directions has increased as video coding technology developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can be sometimes be predicted from neighboring directions used in neighboring, already decoded, blocks.

FIG. 2 is a schematic 201 that depicts 67 prediction modes according to JEM to illustrate the increasing number of prediction directions over time.

The mapping of an intra prediction directions bits in the coded video bitstream that represent the direction can be different form video coding technology to video coding technology; and can range, for example, from simple direct mappings of prediction direction to intra prediction mode to codewords, to complex adaptive schemes involving most probably modes and similar techniques. A person skilled in the art is readily familiar with those techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

SUMMARY

Aspects of the disclosure provide methods and an apparatus for video decoding. In some embodiments, the apparatus for video decoding includes processing circuitry. The processing circuitry decodes at least one syntax element from a coded video bitstream. The at least one syntax element is indicative of a block size of a non-square block under reconstruction that has a rectangular shape. The block size includes a first size in a first dimension and a second size in a second dimension. The first size is different from the second size. The processing circuitry predicts a sample of the non-square block based on a first set of intra prediction directions for the non-square block. The first set of intra prediction directions does not include at least one of a second set of intra prediction directions for a square block.

In some embodiments, the at least one of the second set of intra prediction directions covers a subrange of an angular range covered by the second set of intra prediction directions. In an example, the subrange includes a first end of the angular range.

In some embodiments, intra prediction modes used for the first set of intra prediction directions do not include at least one intra prediction mode used for the at least one of the second set of intra prediction directions.

In some embodiments, at least one intra prediction mode used for the at least one of the second set of intra prediction directions is assigned to at least one of the first set of intra prediction directions. The at least one of the first set of intra prediction directions is not included in the second set of intra prediction directions.

In some embodiments, in a combined angular range covered by the first set of intra prediction directions and the at least one of the second set of intra prediction directions, the at least one of the first set of intra prediction directions is covered by a subrange that includes a first end of the combined angular range. The at least one of the second set of intra prediction directions is covered by another subrange that includes a second end of the combined angular range.

In some embodiments, a first angular range is covered by the first set of intra prediction directions, and a second angular range is covered by the second set of intra prediction directions. A subrange of the first angular range covered by the at least one of the first set of intra prediction directions is outside the second angular range.

In some embodiments, a number of the at least one of the first set of intra prediction directions is equal to a number of the at least one of the second set of intra prediction directions.

In some embodiments, a number of intra prediction modes used for the second set of intra prediction directions for the square block is equal to a number of intra prediction modes used for the first set of intra prediction directions for the non-square block.

In some embodiments, the at least one of the second set of intra prediction directions is based on a shape of the non-square block.

In some embodiments, the at least one of the second set of intra prediction directions is based on an aspect ratio of the non-square block.

Aspects of the disclosure also provide a non-transitory computer-readable storage medium storing a program executable by at least one processor for video decoding to perform any of the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Embodiments of the present disclosure are directed to improving the intra prediction of non-square blocks by, for example, referring to reference samples spatially close to the block under reconstruction. Further, in some embodiments, this process is performed by minimizing the number of directions used.

Figure 1:
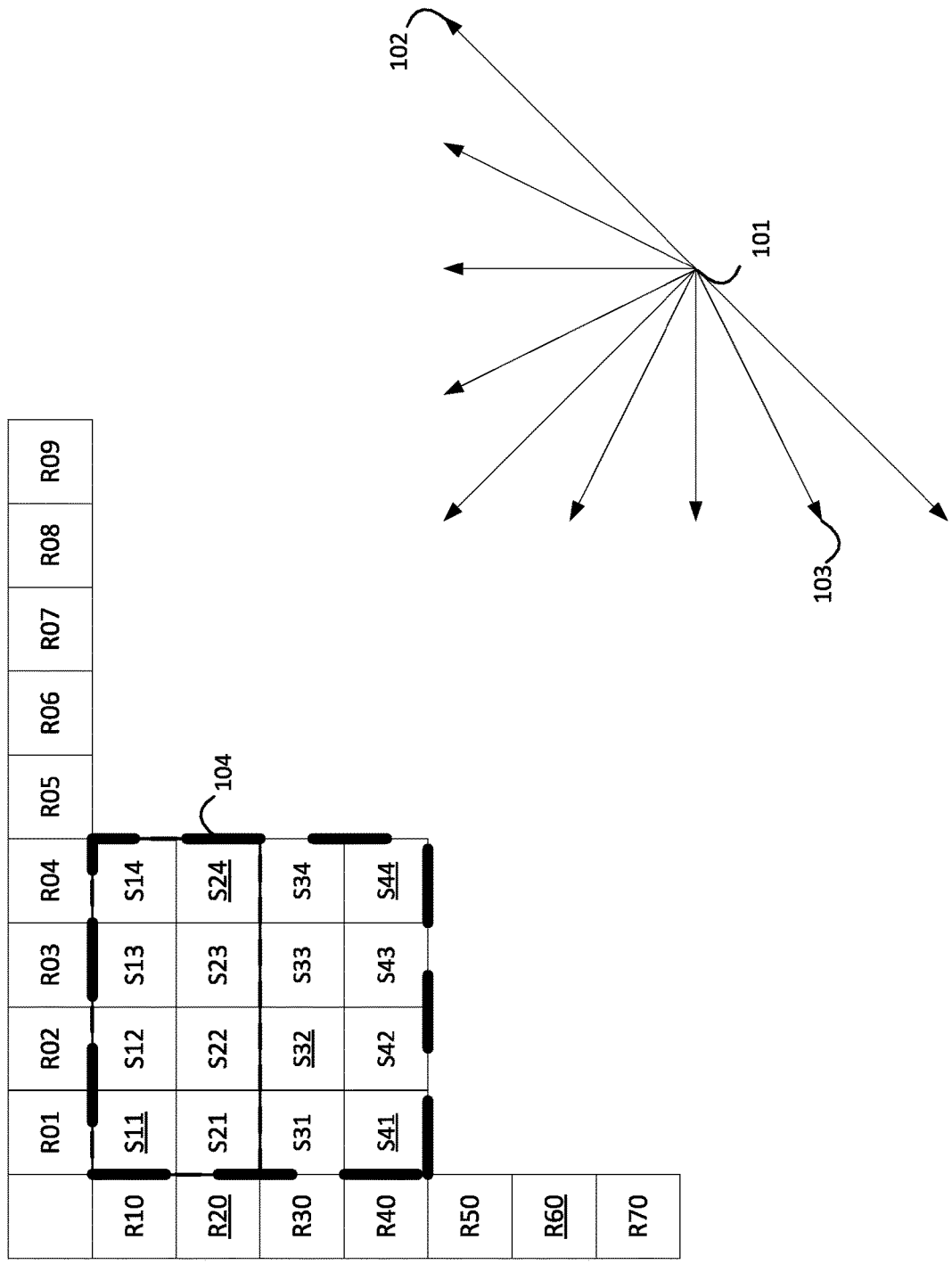
FIG. 1 is a schematic illustration of exemplary intra prediction modes.
Figure 2:
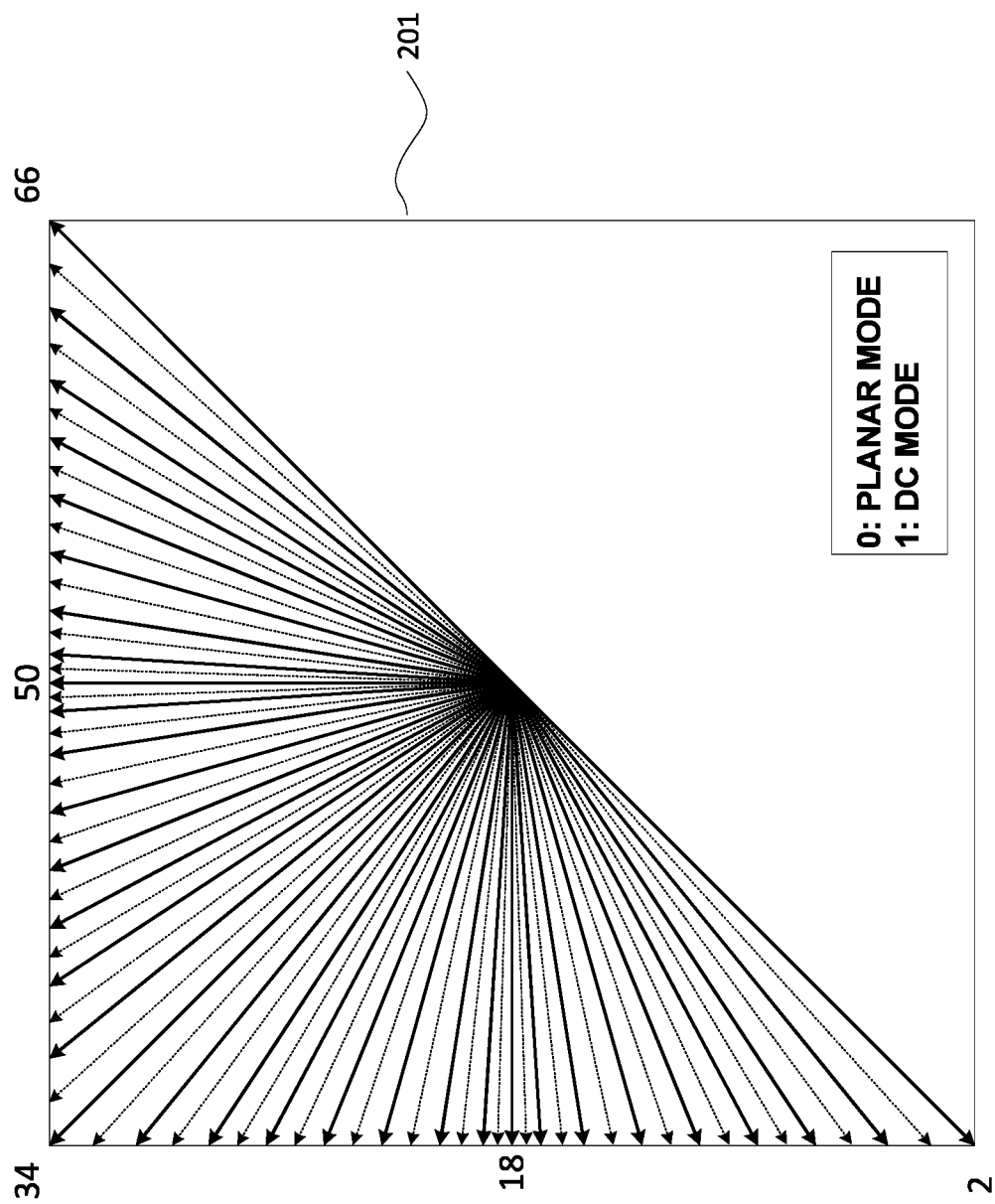
FIG. 2 is another illustration of exemplary intra prediction modes.
Figure 3:
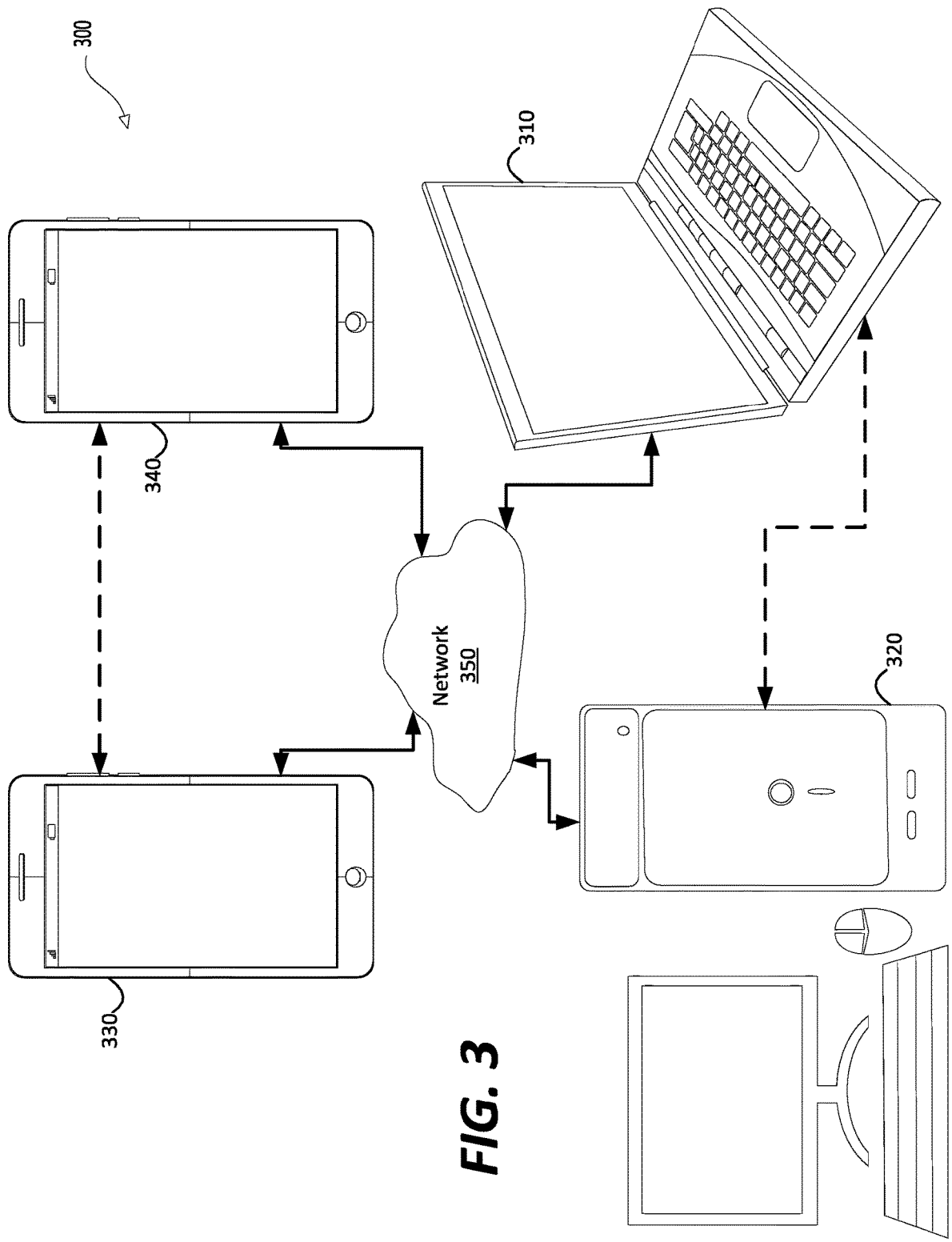
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
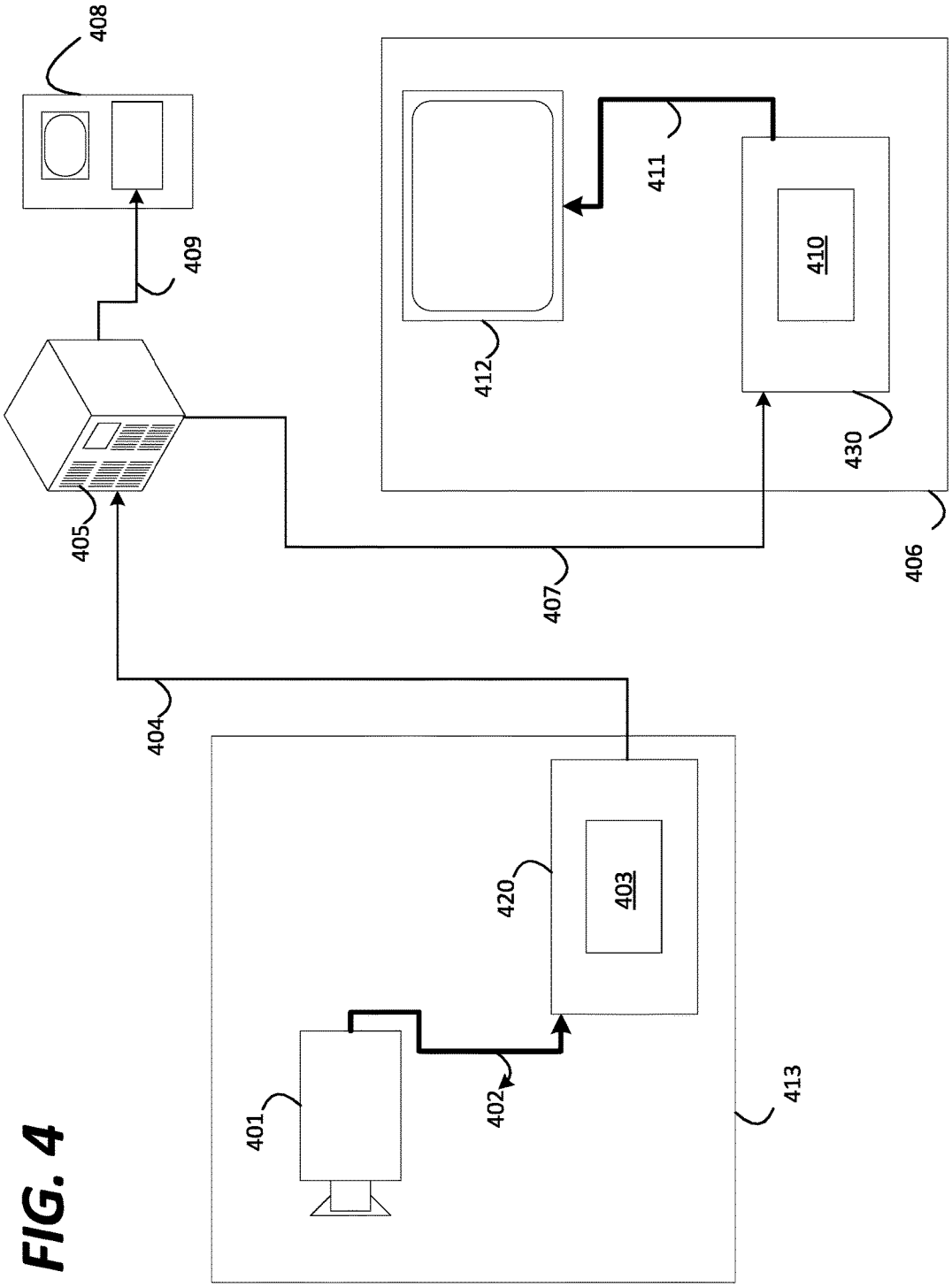
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
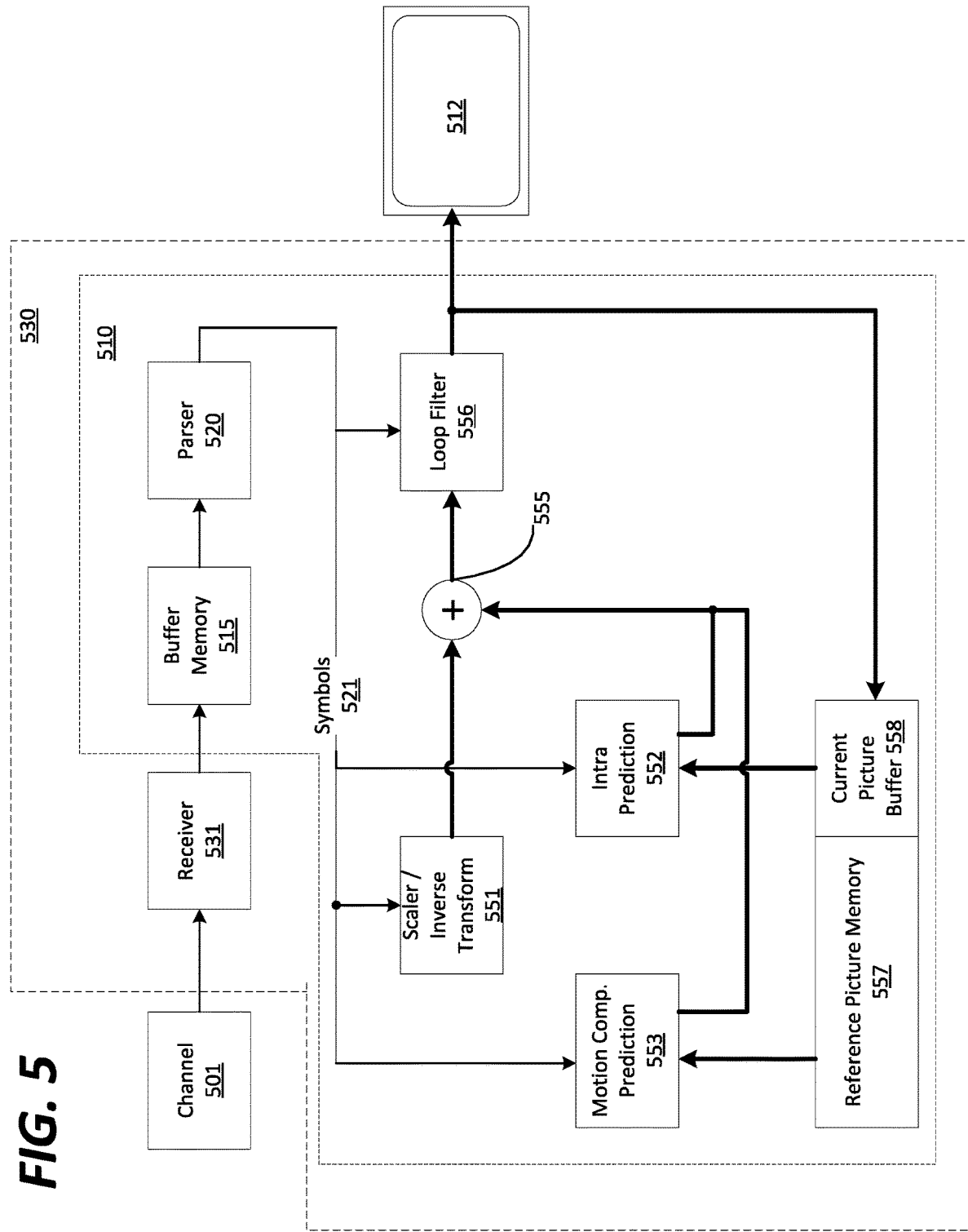
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplementary Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
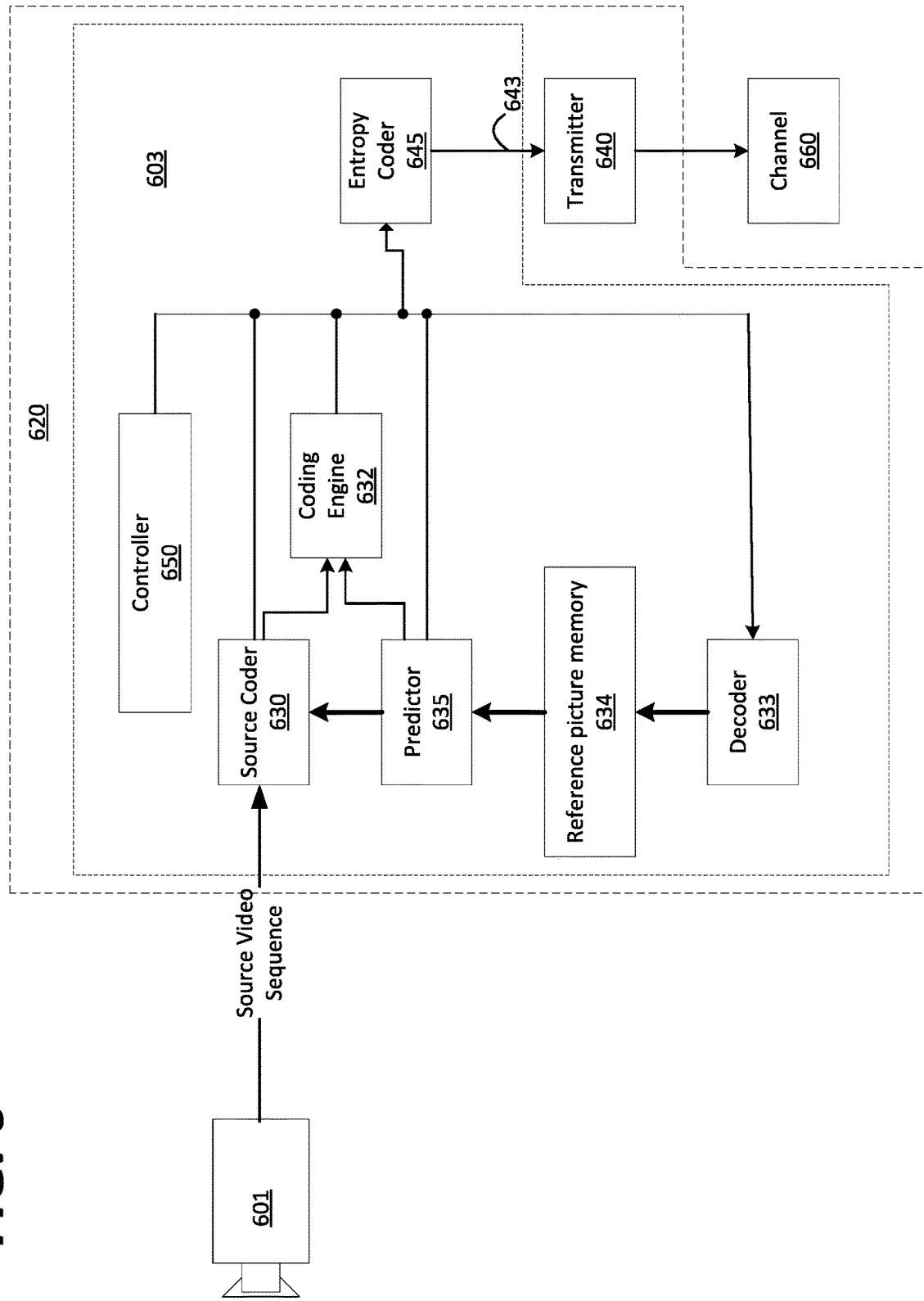
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any color space (for example, BT.601 Y CrCB, RGB, . . . ) and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies known to a person skilled in the art as, for example Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 7:
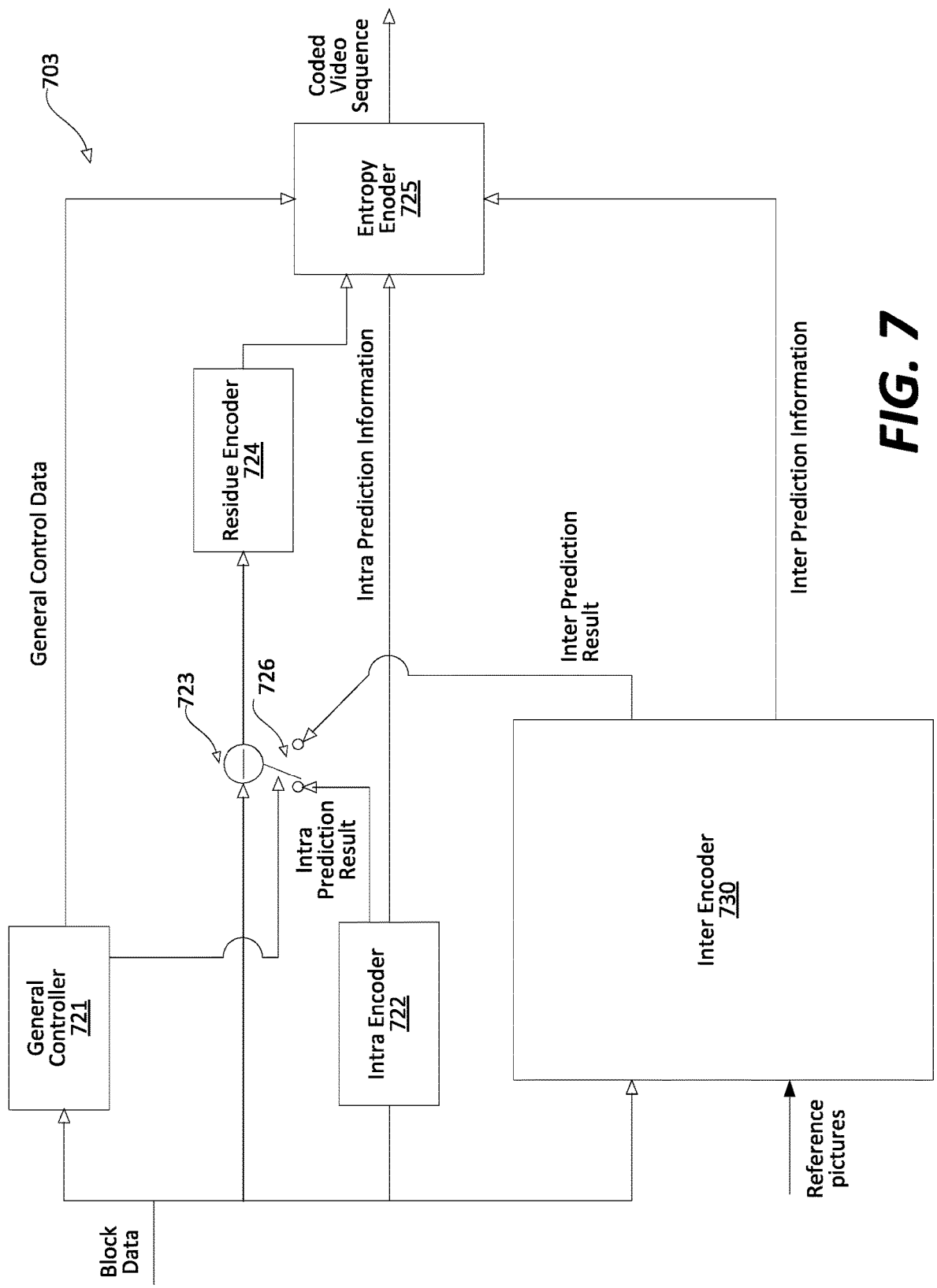
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721) and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder (722) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller (721) is configured to determine general control data and control other components of the video encoder (703) based on the general control data. In an example, the general controller (721) determines the mode of the block, and provides a control signal to the switch (726) based on the mode. For example, when the mode is the intra, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data in the frequency domain, and generate the transform coefficients. The transform coefficients are then subject to quantization processing to obtain quantized transform coefficients.

The entropy encoder (725) is configured to format the bitstream to include the encoded block. The entropy encoder (725) is configured to include various information according to a suitable standard, such as HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
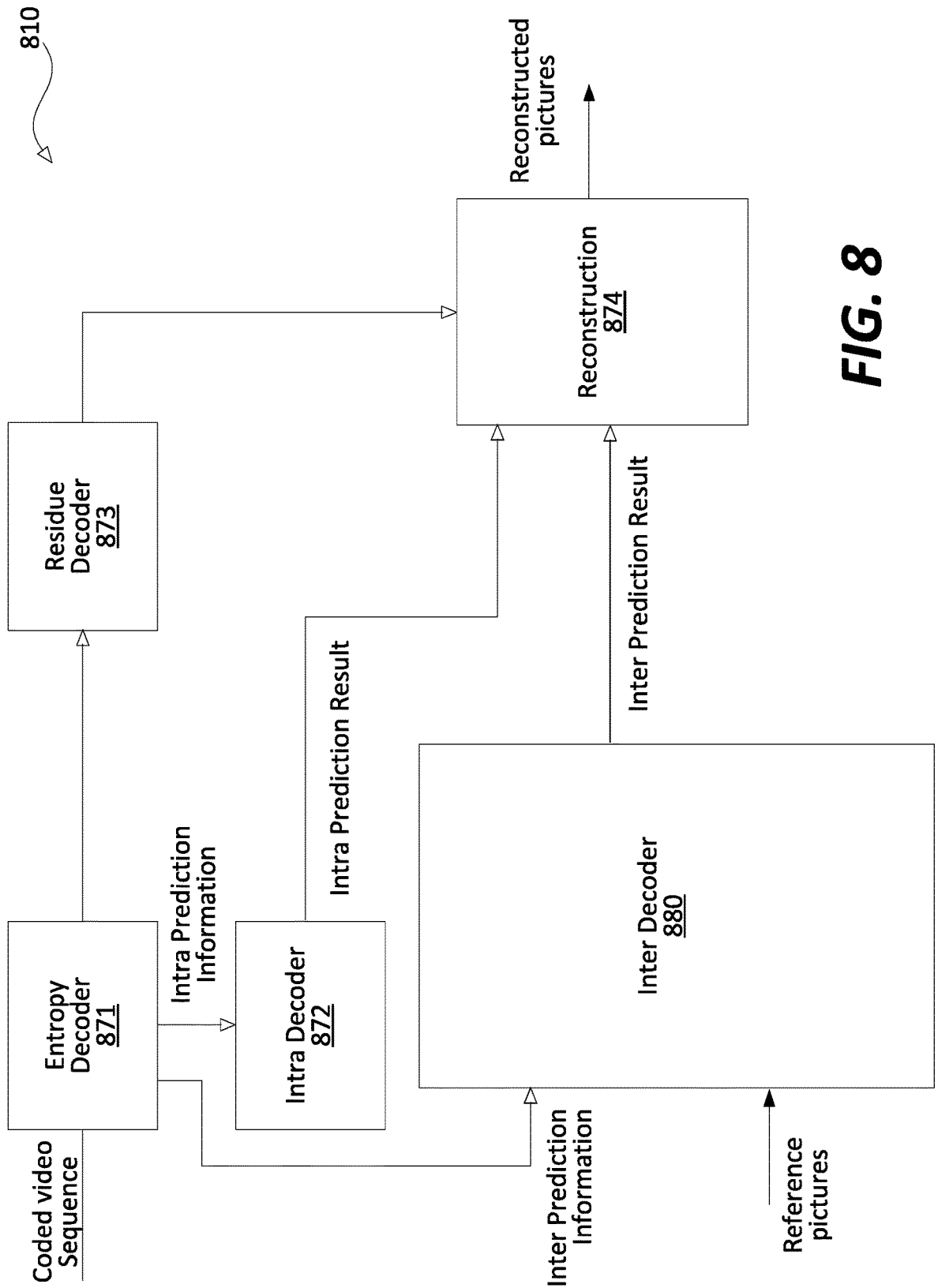
FIG. 8 shows a block diagram of a decoder in accordance with another embodiment.

FIG. 8 shows a diagram of a video decoder (810) according to another embodiment of the disclosure. The video decoder (810) is configured to receive a coded pictures that are part of a coded video sequence, and decode the coded picture to generate a reconstructed picture. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (872) or the inter decoder (880) respectively residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter QP), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603) and (703), and the video decoders (410), (510) and (810) can be implemented using any suitable technique. In an embodiment, the video encoders (403), (603) and (703), and the video decoders (410), (510) and (810) can be implemented using one or more integrated circuits. In another embodiment, the video encoders (403), (603) and (603), and the video decoders (410), (510) and (810) can be implemented using one or more processors that execute software instructions.

Described below are various embodiments of an intra prediction method (also referred to as intra prediction) according to the disclosed subject matter.

In some video compression techniques, intra prediction is conducted on a plurality of samples, called henceforth a "unit" or a block, of a given picture. With respect to the plurality of samples in the unit, the unit can be of any shape. The unit can be continuous or non-continuous. In some video compression techniques, a shape of a unit is restricted to a rectangular block of samples. Dimensions of the rectangular block can be positive integers.

Some video compression techniques further restrict a size of the rectangular block in each dimension, such as an X dimension and a Y dimension, to be a power of two (such as: four samples, eight samples, 16 samples, . . . ).

Some video compression techniques further restrict a shape of the rectangular block to be a square, that is, the size of the rectangular block in the X and the Y dimension is equal. In some examples, the size may or may not be a power of two.

Before further describing the disclosure, the terms "available" and "availability" are introduced below. Consider a unit of samples. The samples can be arranged in a square, a rectangle, or any other suitable shape. Certain prediction samples or metadata of other prediction entities (such as prediction direction of surrounding units) may or may not be "available" for prediction of samples or other prediction entities of the unit depending on, among other factors, a spatial position of the unit in a picture, a coded bitstream structure including a bitstream partitioned into slices, tiles, and so forth. In some video coding technologies, a decoding order of units follows a scan order, i.e., left-to-right and top-to-bottom, thus potential reference information and samples from units that follow the unit under reconstruction in the decoding order are naturally unavailable. Therefore, certain prediction data to the right or below the unit under reconstruction can be unavailable.

In some examples, certain prediction samples and other prediction entities may be unavailable even when the certain prediction samples are included in units that precede the unit under reconstruction in the decoding order, and are located to the left or above the unit. For example, a sample or prediction entity may be unavailable when the unit under reconstruction is at a boundary of a picture or a picture segment, for example, a slice or an (independent) tile. In various examples, slice and tile boundaries are treated, for the purpose of prediction, as picture boundaries. Similarly, prediction entities other than prediction samples may be unavailable even when the prediction samples are available, when the reference unit is coded in a mode that does not allow for generation or use of the prediction entity. For example, a prediction unit coded in a skip mode does not have a prediction direction associated with the prediction unit.

When a prediction sample or prediction entity is not available, in at least some cases, a value of the prediction sample or the prediction entity can be predicted from neighboring samples of the prediction sample. When the prediction samples/the prediction entities are predicted, accuracy of the prediction method can be, for example, sub-optimal. However, as an encoder selects a prediction mode based on state information that includes both prediction sample values and how the prediction sample values are generated (including prediction from samples that are predicted due to unavailability), the encoder can use, at least in some cases, a mode that does not rely on intra prediction. In some examples, rate-distortion optimization techniques can be used to select an appropriate mode.

Both predicted samples and available neighboring prediction samples can, for example, be luminance samples, chrominance samples, samples belong to a given color plane, and so forth. For example, in some video processing systems employing video decoders, a video is sampled in a YCrCb 4:2:0 sampling structure with chrominance samples Cr and Cb being subsampled and handled in the respective chroma planes, thus, intra prediction can occur separately in each of the Y, Cr, and Cb color plane. Control of the intra prediction can, in some cases, be generated in an encoder based on the Y plane, signaled in a coded video bitstream in relation to the Y plane, and applied in a decoder to a Y plane and Cr/Cb plane separately. In another example, samples can be green samples of a picture using a RGB color space, and red and blue samples are handled in the respective R and B color planes. In other scenarios, intra prediction is performed for one or more color planes independently from other color planes, by both an encoder and a decoder. Other suitable sampling structures, color spaces, and so forth, can also be used in intra prediction.

Figure 9:
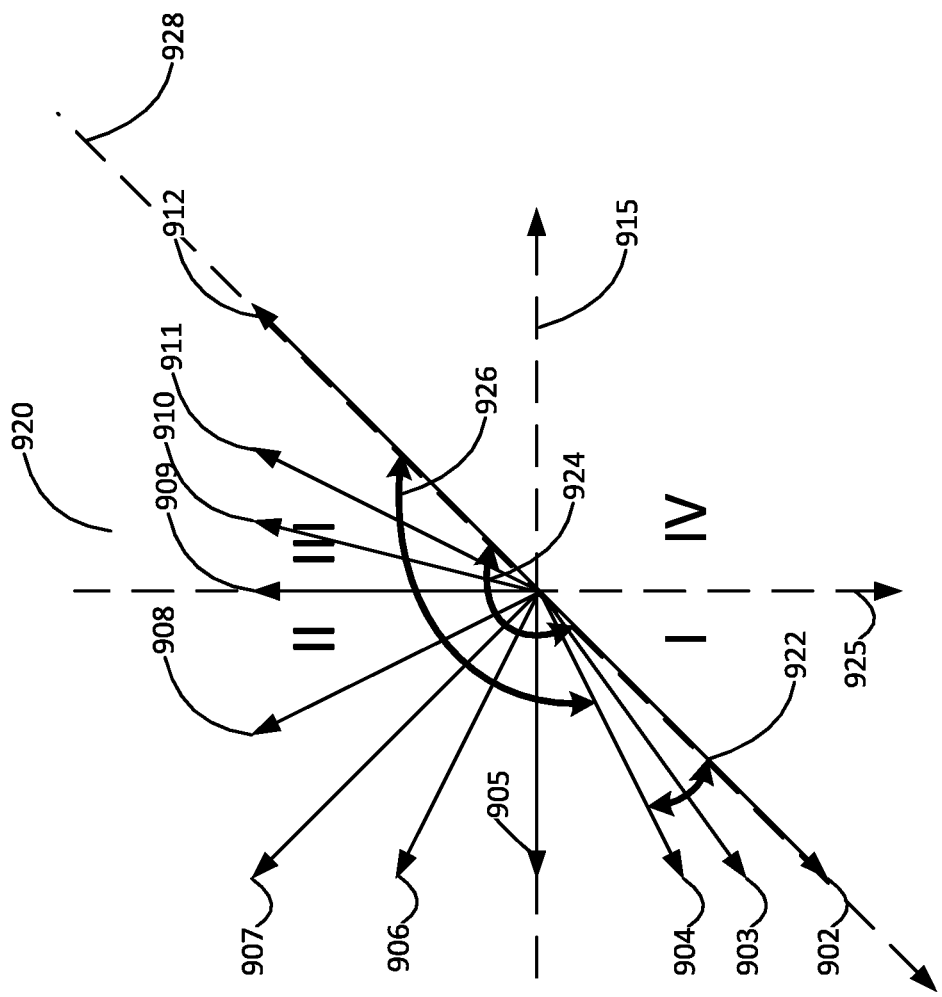
FIG. 9 shows a schematic illustration of an intra prediction of samples in a non-square block in accordance with an embodiment.

Referring to FIG. 9, in an embodiment, a unit under reconstruction (henceforth "block") (901) may be of rectangular, but not square shape, thus, the block (901) under reconstruction can be referred to as a non-square block (901). In an example, the block (901) includes samples S11-S14 and S21-S24 in a coded picture. In an example, samples in the block (901) can be predicted based on intra prediction using prediction samples in the same coded picture, such as prediction samples R01-R09 and R10-R70, of the block (901). The intra prediction of the samples in the block (901) can be performed along an intra prediction direction, also referred to as a prediction direction in the disclosure.

In some embodiments, such as shown in FIG. 9, a width of the non-square block (901) is from left to right, and a height of the non-square-block (901) is from top to bottom. Similarly, the first direction (915) points from left to right, and a second direction (925) points from top to bottom. The first direction (915) and the second direction (925) form four quadrants, i.e., a bottom left quadrant I, a top left quadrant II, a top right quadrant III, and a bottom right quadrant IV. A diagonal direction (928) points from top right to bottom left, and equally divides the bottom left quadrant I and the top right quadrant III, respectively.

In general, intra prediction directions in video compression techniques can be optimized for square blocks. Referring to FIG. 9, a second set (920) of intra prediction directions for the square blocks includes intra prediction directions (902-912). The second set (920) of intra prediction directions for the square blocks covers a second angular range (924). In some embodiments, the second angular range (924) spans from 135° clockwise (CW) from an first direction (915) to 45° counterclockwise (CCW) from the first direction (915), thus covering an angular range of 180°. Referring to FIG. 9, the prediction direction 902, referred to as a first end of the second angular range (924) is 135° clockwise from the first direction (915). The prediction direction 902 is parallel to the diagonal direction (928). The prediction direction 912, referred to as a second end of the second angular range (924), is 45° counterclockwise from the first direction (915). In various embodiments, the second set (920) can include other prediction directions not shown in FIG. 9. In general, the second set (920) of intra prediction directions can include any suitable intra prediction directions that, for example, are between the first end (902) and the second end (912). For example, there are 65 intra prediction directions used in VVC.

Certain intra prediction directions that can be useful for square blocks can be less useful for non-square blocks, such as the block (901), because the spatial correlation between certain samples of the block (901) and prediction samples used based on the certain intra prediction directions is low. For example, when the intra prediction direction (902) is used for intra prediction, samples S11 and S21 in the block (901), for example, can be predicted from respective reference samples R20 and R30 that are direct neighbors of the block (901). Certain samples of the block (901) are predicted from reference samples that are not direct neighbors and can be relatively (spatially) far away from the block (901). For example, the sample S24 is predicted from the reference sample R60, which is far away spatially. In various embodiments, intra prediction works well with a close spatial relationship between reference samples and samples to be predicted, for example, the samples to be predicted are spatially close to the reference samples. Therefore, in various embodiments, an intra prediction direction such as the intra prediction direction (902) may not be chosen by a rate-distortion optimized encoder for the non-square block (901).

In some embodiments, intra prediction directions are mapped to intra prediction modes (also referred to as prediction modes), and the intra prediction modes can be further mapped into codewords. As described above, certain intra prediction directions can be statistically more likely to be used than other intra prediction directions. The certain intra prediction directions can be mapped into first codewords, the other intra prediction directions can be mapped into second codewords. Therefore, the first codewords can use less numbers of bits than those of the second codewords, thus, can be relatively shorter than the second codewords. In some examples, intra prediction directions/modes mapped to the first codewords are referred to as "short" modes. The "short" mode can be a mode that is likely to be chosen by a rate-distortion optimized encoder. For example, the intra prediction direction (902) can correspond to a short mode for the square blocks.

When using the same mapping of intra prediction directions to intra prediction modes as designed and optimized for the square blocks, valuable "short" modes for the intra prediction directions for the square blocks can be wasted for intra prediction directions, such as the intra prediction direction (902), for the non-square block (901). As described above, when there is a direct mapping between an intra prediction mode and a variable length codeword, a "short" mode can be represented by a short variable length codeword.

In the same or another embodiment, certain intra prediction directions located at an end, such as the first end (902), of the second angular range (924) of the second set (920) of intra prediction directions used for the square blocks, are unlikely to be chosen by a rate-distortion optimized encoder for the non-square block (901) because of a low spatial correlation between certain samples in the non-square block (901) and the corresponding reference samples used based on the certain intra prediction directions located at the end. Therefore, the certain intra prediction directions are not used in a first set of intra prediction directions for the non-square block (901). For example, for certain block shapes, such as the non-square block (901) (see also description below), the prediction directions between the first end (902) and the intra prediction direction (904) that is 22.5° CW from the first end (902) can form a subrange (922) of the second angular range (924), and the subrange (922) includes the intra prediction directions that are not used in the first set of intra prediction directions for the non-square block (901). The subrange (922) can also be referred to as a removed subrange (922). In one example, the subrange (922) excludes the intra prediction direction (904), and includes the first end (902) and any intra prediction directions in the second set (920), such as the intra prediction direction (903), that are between the first end (902) and the intra prediction direction (904). Referring to FIG. 9, the first set of intra prediction directions for the non-square block (901) covers a first angular range (926) having two ends, the intra prediction directions (904 and 912).

In the same or another embodiment, the subrange (922) that includes the intra prediction directions that are not used in the first set of intra prediction directions for the non-square block (901) can be dependent on spatial characteristics of the non-square block (901). In the same or another embodiment, the spatial characteristics of the block (901) can include a shape of the block (901). In some examples, the shape of the block (901) can be a relationship of sizes of the block (901) in the X and the Y dimension, i.e., a first size in the X dimension, also the width from left to right, and a second size in the Y dimension, also the height from top to bottom. As an example, in the same or another embodiment, for the block (901) with an aspect ratio of the first size in the X dimension over the second size in the Y dimension being 2:1 as shown in FIG. 9, the subrange (922) can be between the intra prediction direction (902) (135° CW from the first direction (915)) and the intra prediction direction (904) (22.5° CW from the intra prediction direction (902)) in the bottom left quadrant I.

When the aspect ratio is larger than 1, the subrange (922) can include the first end (902) of the second set (920) and is located in the bottom left quadrant I. When the aspect ratio that is larger than 1 increases, the subrange (922) can become larger, thus including more intra prediction directions in the second set (920).

In general, a subrange that includes intra prediction directions in the second set for the square blocks that are not used in a first set of intra prediction directions for a non-square block can be determined based on symmetry along the diagonal direction (928).

In some embodiments, when an aspect ratio of a non-square block under reconstruction is less than 1, a subrange in the second set (920) includes the second end (912) of the second set (920) and is located in the top right quadrant III. Note that the subrange in the second set (920) is not included in a first set of intra prediction directions for the non-square block. In the same or another embodiment, for a non-square block with an aspect ratio of a first size in the X dimension over a second size in the Y dimension being 1:2, a subrange can be between the second end (912) and the intra prediction direction (911) in the top right quadrant III. In various embodiments, the subrange includes the second end (912). The second end (912) is opposite to the diagonal direction 928, and the intra prediction direction (911) is 22.5° CCW from the second end (912). When the aspect ratio that is less than 1 decreases, the subrange can become larger, thus including more intra prediction directions in the second set (920).

Figure 10:
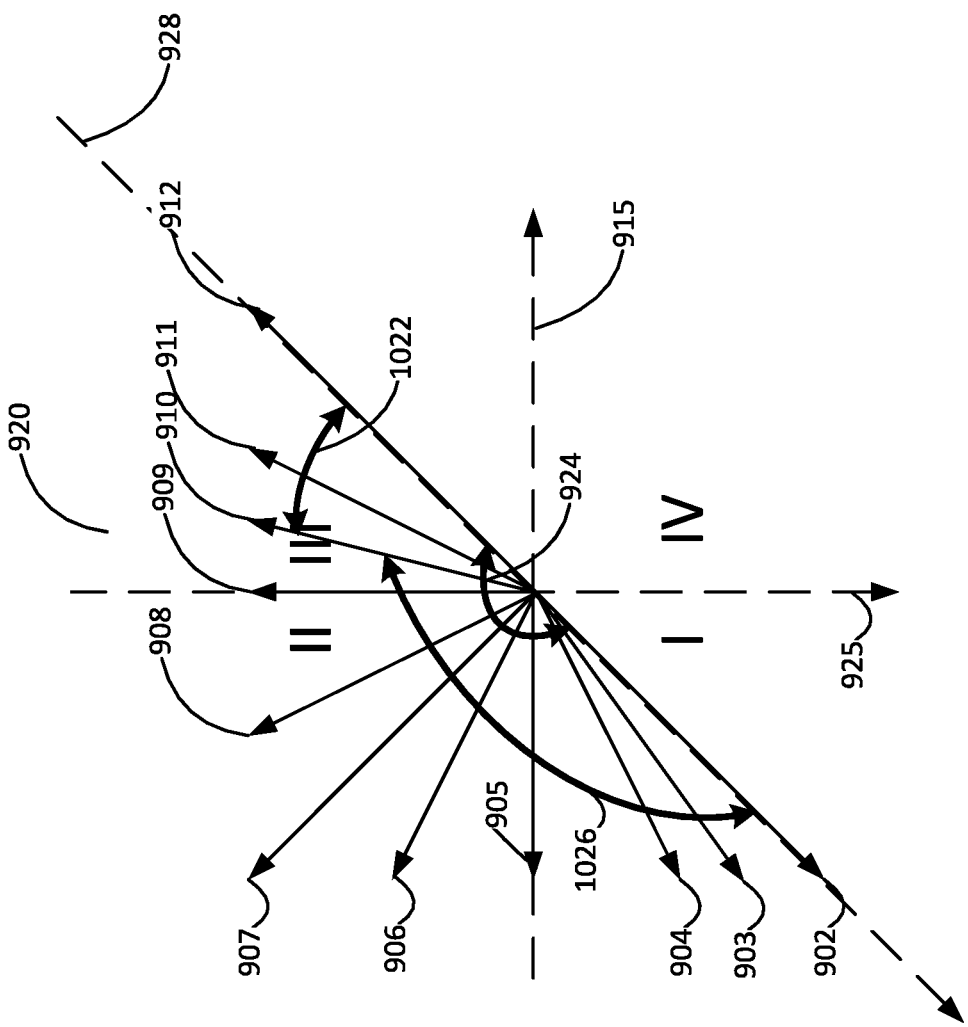
FIG. 10 shows a schematic illustration of an intra prediction of samples in a non-square block in accordance with an embodiment.

Referring to FIG. 10, shown is a non-square block or block (1001) of 1×4 samples, representative of block sizes with an aspect ratio of 1:4. Similarly, the second set (920) of intra prediction directions for the square blocks includes intra prediction directions (902-912), as shown in the lower right of FIG. 10. In various examples, the second set (920) of intra prediction directions for the square blocks and the second angular range (924) are identical to those shown in FIG. 9, thus, detailed descriptions are omitted for purposes of clarity. The four quadrants I-IV are also identical to those in FIG. 9, thus, detailed descriptions are omitted for purposes of clarity.

In various embodiments, a first set of intra prediction directions can be used for the non-square block (1001), and the first set does not include intra prediction directions in a subrange (1022) of the second angular range (924). As shown in FIG. 10, the subrange (1022) can be between the second end (912) and the intra prediction direction (910). The second end (912) is opposite to the diagonal direction 928 or 45° CCW from the first direction (915) and the intra prediction direction (910) is 11.25° CW from the intra prediction direction (909) that is opposite to the second direction (925). In various examples, the subrange (1022) includes the second end (912), and excludes the intra prediction direction (910). Referring to FIG. 10, the first set covers a first angular range (1026). In an example, the first angular range (1026) includes the first end (902) of the second set (920), the intra prediction direction (910), and other intra prediction directions of the second set (920) in between.

Other suitable subranges for other block shapes and/or aspect ratios of non-square blocks may include one or more intra prediction directions in the second set (920) for the square blocks that are not used in a first set for the non-square blocks.

In the same or another embodiment, intra prediction modes for the square blocks corresponding to the intra prediction directions that are part of the removed subrange are not used for non-square blocks. As an example, in FIG. 9, an intra prediction mode associated with the intra prediction direction (903) that is part of the subrange (922) is not used for the non-square block (901). In some embodiments, a table of modes can be used to relate intra prediction directions and corresponding intra prediction modes used for a block. The table of modes for the non-square block (901) can be shortened accordingly, leading to a smaller number used for the intra prediction modes and, thereby potential for optimized entropy coding and better coding efficiency. In the same or another embodiment, the table of modes can be reordered according to a likelihood of the intra prediction directions still represented in the table of modes.

In the same or another embodiment, when the intra prediction directions in the removed subrange are not used for a non-square block, the associated intra prediction modes can be re-assigned for other purposes, including, for example, signaling of previously unused directions, modes not directly associated with a prediction direction, filter control of filters pertaining to reference samples or intra predicted samples, and so forth.

In the same or another embodiment, certain intra prediction directions, referred to as added intra prediction directions, are added to a first set of intra prediction directions used for non-square blocks. A number of the added intra prediction directions can be the same as a number of intra prediction directions (referred to as removed intra prediction directions) in the removed subrange described above. The added intra prediction directions can encompass a subrange referred to as an added subrange. The added subrange is included in a first angular range covered by the first set of intra prediction directions for the non-square blocks. The added subrange can be of the same geometry as the removed subrange, as described below.

Figure 11:
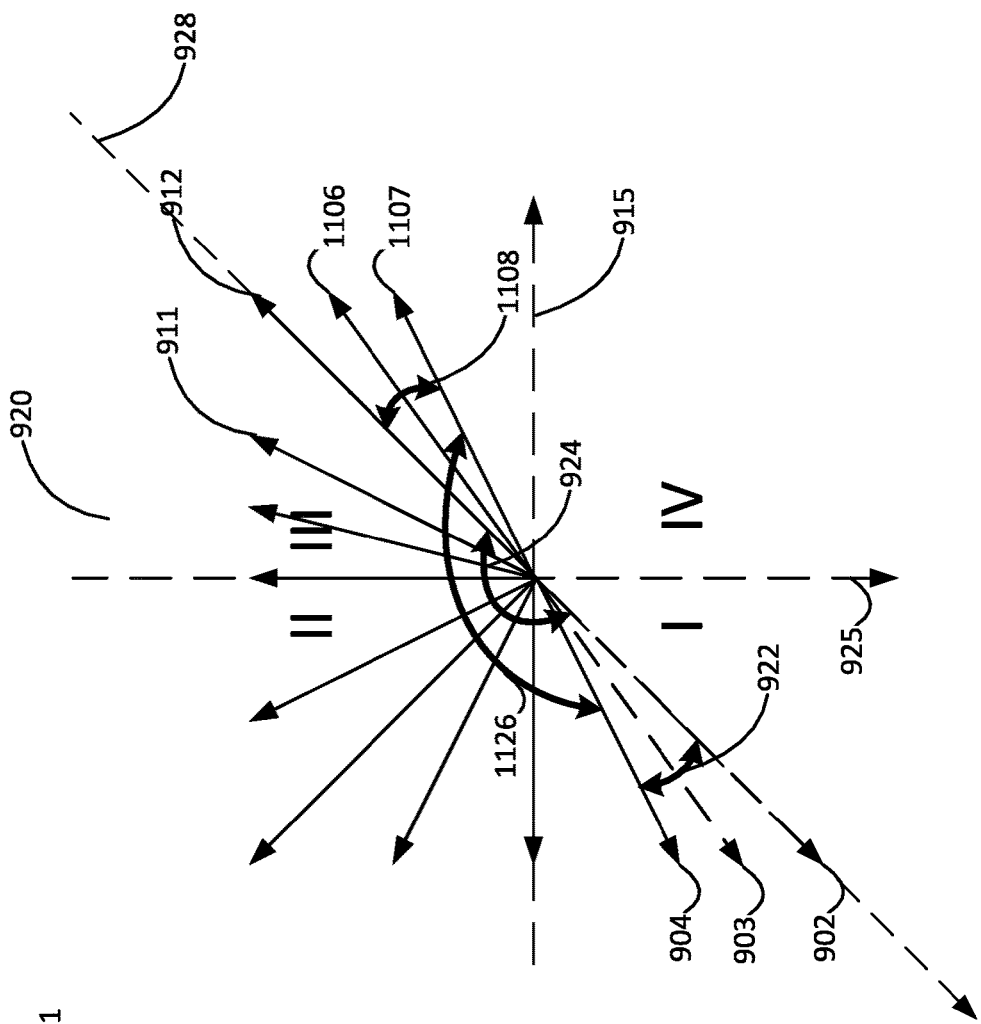
FIG. 11 shows a schematic illustration of an intra prediction of samples in a non-square block in accordance with an embodiment.

FIG. 11 shows a non-square block (1101), a 4×2 block under reconstruction having an identical aspect ratio as that of the non-square block (901) shown in FIG. 9. Further shown is the second set (920) of intra prediction directions for the square blocks. In various examples, the second set (920) of intra prediction directions for the square blocks and the second angular range (924) are identical to those shown in FIG. 9, thus, detailed descriptions are omitted for purposes of clarity. Note that the intra prediction directions 902-912 for the square blocks are shown, however, for purposes of clarity, only the intra prediction directions 902-904, 911-912 are labeled in FIG. 11. The four quadrants I-IV are identical to those in FIG. 9, thus, detailed descriptions are omitted for purposes of clarity.

Similarly, the intra prediction directions in the removed subrange or subrange (922) are not included in a first set of intra prediction directions for the non-square block (1101). The subrange (922) is identical to that shown in FIG. 9, thus detailed description is omitted for purposes of clarity. Two intra prediction directions (902, 903) in the subrange (922) are depicted using dashed lines. The intra prediction modes used to represent the intra prediction directions (902, 903) for the square blocks can be re-used to represent, in this example, two added intra prediction directions (1106, 1107) in an added subrange (1108). Accordingly, the first set of intra prediction directions for the non-square block (1101) covers a first angular range (1126) with a first end (904) and a second end (1107). The first end or the intra prediction direction (904) is 22.5° CW from the diagonal direction (928), the second end (1107) is 22.5° CW from the intra prediction direction (912) that is opposite to the diagonal direction (928). The first angular range (1126) includes the added subrange (1108) and does not include the removed subrange (922). In some examples, such as shown in FIG. 11, the removed subrange (922) includes intra prediction directions between the intra prediction directions (902) and (904). Further, the removed subrange (922) includes the intra prediction direction (902) and does not include the intra prediction direction (904). On the other hand, the added subrange (1108) includes intra prediction directions between the second end (912) of the second set (920) and the added intra prediction direction (1107). Further, the added subrange (1108) includes the added intra prediction direction (1107) and does not include the second end (912).

In some examples, such as shown in FIG. 11, the removed subrange (922) and the added subrange (1108) are symmetric with respect to the diagonal direction (928). As described above, the removed subrange (922) covers an angular range of 22.5° CW from the diagonal direction (928), and the added subrange (1108) covers an angular range of 22.5° CW from an opposite direction of the diagonal direction (928).

The added intra prediction directions can be beneficial when used for the non-square block (1101) as shown in FIG. 11. For example, consider the added intra prediction direction (1107). Using the intra prediction direction (1107), a sample S11 in the non-square block (1101) can be predicted from a reference sample R03, and a sample S14 can be predicted from a reference sample R06 that is adjacent to a direct neighbor R05 of the non-square block (1101). Therefore, the samples included in the block (1101) can be predicted in the added intra prediction direction (1107), and the reference samples used to predict the samples in the block (1101) are relatively close to the samples in the block (1101) as compared to using an intra prediction direction in the removed subrange (922).

The benefit of the added subrange can come without an increase of a number of intra prediction modes for the non-square block (1101) vis a vis a number of intra prediction modes for the square blocks. In some embodiments, a number of intra prediction directions in the removed subrange (922) is identical to a number of intra prediction directions in the added subrange (1108), thus, a number of intra prediction directions in the first set for the non-square block (1101) is identical to a number of intra prediction directions in the second set (920) for the square blocks. In some examples, as described above, intra prediction modes assigned to the intra prediction directions in the removed subrange (922) for the square blocks are reassigned to the intra prediction directions in the added subrange (1108) for the non-square blocks, thus, a number of intra prediction modes used for the first set for the non-square block (1101) is equal to a number of intra prediction modes used for the second set (920) for the square blocks.

In some examples, a number of intra prediction directions in the first set for the non-square block (1101) can be less than a number of intra prediction directions in the second set (920) for the square blocks when a number of intra prediction directions in the added subrange is less than a number of intra prediction directions in the removed subrange. In some other examples, such as shown in FIG. 9, a number of intra prediction directions in the first set can be less than a number of intra prediction directions in the second set when the first set does not include the added subrange. Therefore, a number of intra prediction modes for the non-square block (1101) is less than a number of intra prediction modes for the square blocks.

In some examples, in order to predict samples (S21-S24) in a second row of the non-square block (1101) using the intra prediction direction (1106) or (1107), certain interpolation/filtering techniques can advantageously be employed to predict the samples (S21-S24) from more than one reference sample, or to avoid aliasing artifacts. Several such interpolation/filtering techniques include the one specified for certain intra prediction directions that are, for example, not multiples of 45° from the diagonal direction (928), such as specified in H.265. For example, the added intra prediction directions (1106 and 1107) are 11.25° and 22.5° CW from an opposite direction of the diagonal direction (928) and, thus, are not multiples of 45° from the diagonal direction (928). On the other hand, the intra prediction direction 907 is 90° CW from the diagonal direction (928), thus, is a multiple (2 times) of 45° from the diagonal direction (928).

The symmetry considerations described above in the context of removing the removed intra prediction directions can equally apply to adding the added intra prediction directions. Similarly, a size of the added subrange can be dependent on the block shape of the block (1101) in a similar way as a size of the removed subrange can be dependent on the block size. As described above in reference to FIG. 9 when the aspect ratio of the non-square block (901) that is larger than 1 increases, the subrange (922) can become larger, thus including more intra prediction directions of the second set (920).

Figure 12:
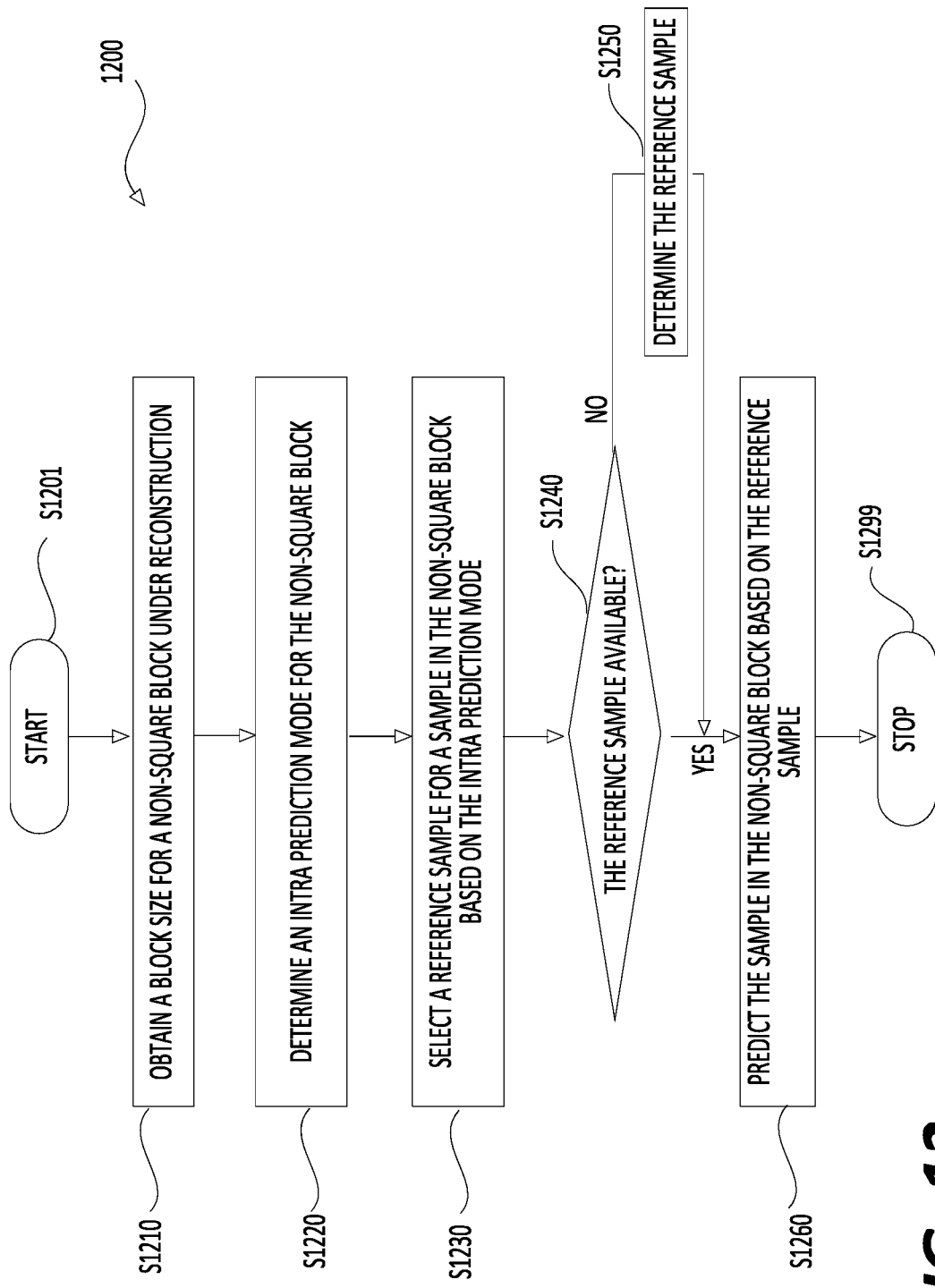
FIG. 12 shows a flow chart outlining a process (1200) according to some embodiments of the disclosure.

FIG. 12 shows a flow chart outlining a process (1200) according to some embodiments of the disclosure. The process (1200) is used in intra prediction to generate a prediction block for a non-square block under reconstruction. In various embodiments, the process (1200) is executed by processing circuitry, such as the processing circuitry in the terminal devices (310, 320, 330 and 340), the processing circuitry that performs functions of the video encoder (403), the processing circuitry that performs functions of the video decoder (410), the processing circuitry that performs functions of the video decoder (510), the processing circuitry that performs functions of the intra prediction module (552), the processing circuitry that performs functions of the video encoder (603), the processing circuitry that performs functions of the predictor (635), the processing circuitry that performs functions of the decoder (633), the processing circuitry that performs functions of the intra encoder (722), the processing circuitry that performs functions of the intra decoder (872), and the like. The process starts at (S1201) and proceeds to (S1210).

At (S1210), a block size for a non-square block under reconstruction is obtained. For example, at least one syntax element from a coded video bitstream is decoded. The at least one syntax element is indicative of the block size of the non-square block. The block size includes a first size in a first dimension, such as a width of the non-square block, and a second size in a second dimension, such as a height of the non-square block, and the first size is different from the second size. In some examples, additional information, such as a location of the non-square block within a picture under reconstruction, is obtained.

At (S1220), the processing circuitry determines an intra prediction mode for the non-square block. In various embodiments, the intra prediction mode corresponds to an intra prediction direction in a first set of intra prediction directions for the non-square block. As described above in reference to FIGS. 9-11, the first set of intra prediction directions does not include one or more intra prediction directions of a second set of intra prediction directions for square blocks.

At (S1230), the processing circuitry selects a reference sample for a sample in the non-square block based on the intra prediction mode. Referring to FIG. 11, in some examples, the non-square block is the block (901), and the intra prediction mode represents the intra prediction direction (912). In order to predict, for example, the sample S21 using the intra prediction direction (912), the processing circuitry determines the reference sample to be R03.

At (S1240), the processing circuitry determines whether the reference sample is available, as described above. When the reference sample is available, the process (1200) proceeds to (S1260). When the reference sample is not available, the process (1200) proceeds to (S1250).

At (S1250), the processing circuitry determines a value for the reference sample, for example, using a neighboring sample of the reference sample, as described above. For example, when the reference sample R03 is not available, other samples, such as R02, and the like, can be used to determine a value for the reference sample R03. The process (1200) then proceeds to (S1260).

At (S1260), the processing circuitry predicts the sample in the non-square block based on the reference sample. In some embodiments, a value of the sample S21 is obtained based on the value of the reference sample R03. For example, the value of the sample S21 is equal to the value of the reference sample R03. In some examples, when the intra prediction mode represents, for example, an intra prediction direction (911), a value of the sample S21 can be determined based on more than one reference sample, using interpolation, filtering, and the like. Then the process (1200) proceeds to (S1299) and terminates.

Note that the process (1200) can be suitably adapted. For example, at (S1230), the processing circuitry can select more than one reference sample for a sample in the non-square block based on the intra prediction mode when the intra prediction mode represents, for example, an intra prediction direction (910).

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
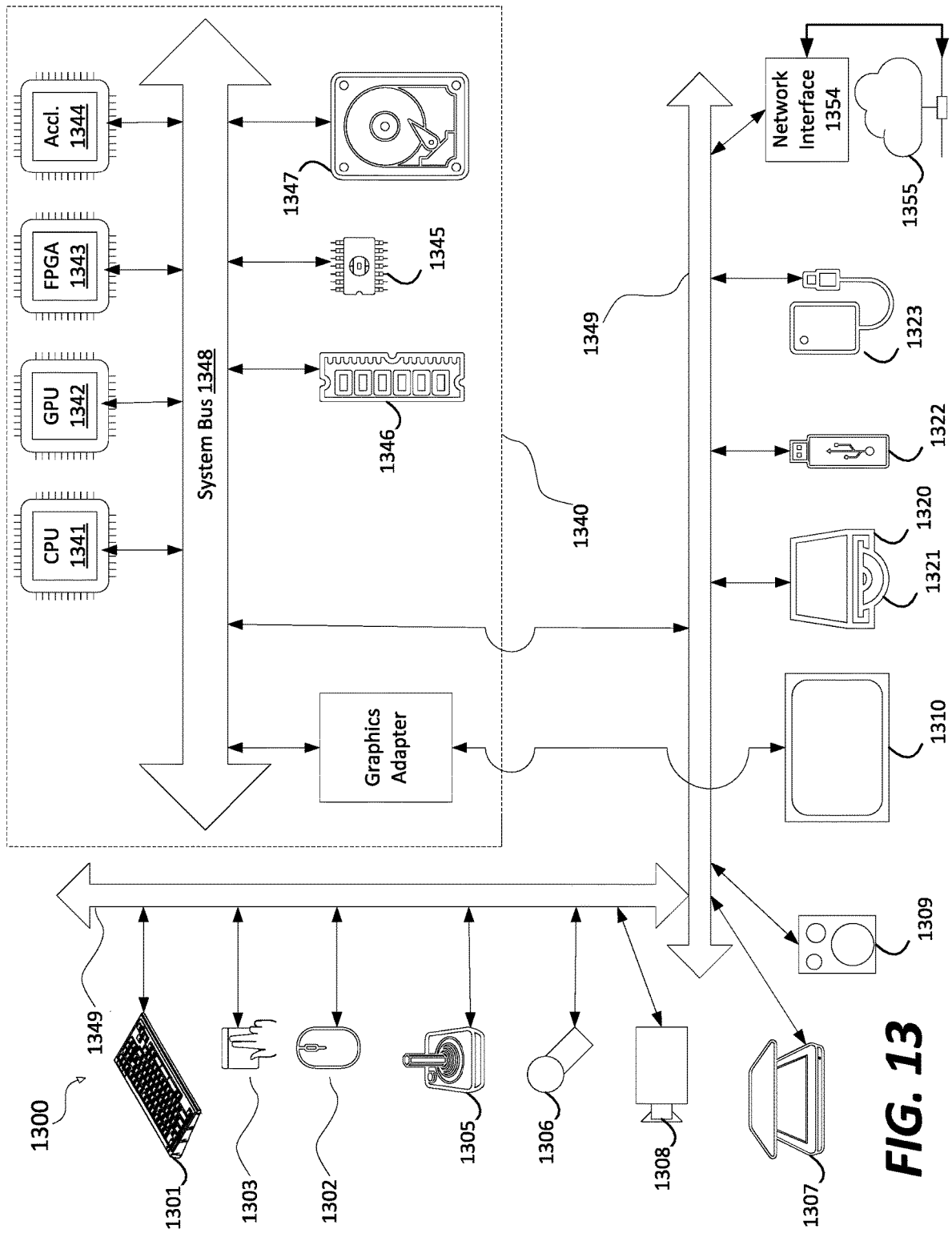
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus USB: Universal Serial Bus
PCI: Peripheral Component Interconnect
FPGA: Field Programmable Gate Areas
SSD: solid-state drive
IC: Integrated Circuit
CU: Coding Unit
JEM: Joint Exploration Model
VVC: Versatile Video Coding
BMS: Benchmark Set
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder in accordance with a video coding technology, the method comprising:
    decoding at least one syntax element from a coded video bitstream, the at least one syntax element indicative of a block size of a non-square block under reconstruction that has a rectangular shape, the block size including a first size in a first dimension and a second size in a second dimension, the first size being different from the second size;
    determining a first set of intra prediction directions for the non-square block based on the block size and from a second set of intra prediction directions for a square block, the first set of intra prediction directions including a first angular subrange of the second set of intra prediction directions and not including a second angular subrange of the second set of intra prediction directions, and each of the second set of intra prediction directions being included in one of the first angular subrange and the second angular subrange; and
    predicting a sample of the non-square block based on the first set of intra prediction directions for the non-square block.

2. The method of claim 1, wherein the first set of intra prediction directions does not include one of the second set of intra prediction directions that corresponds to an end of an angular range covered by the second set of intra prediction directions, the end of the angular range being an end of the second angular subrange.

3. The method of claim 2, wherein intra prediction modes used for the first set of intra prediction directions do not include an intra prediction mode used for the one of the second set of intra prediction directions.

4. The method of claim 2, wherein an intra prediction mode used for the one of the second set of intra prediction directions is assigned to one of the first set of intra prediction directions, the one of the first set of intra prediction directions not being included in the second set of intra prediction directions.

5. The method of claim 4, wherein in a combined angular range covered by the first set of intra prediction directions and the second angular subrange, the one of the first set of intra prediction directions corresponds to a first end of the combined angular range, and the second angular subrange includes a second end of the combined angular range, the second end being the end of the angular range covered by the second set of intra prediction directions.

6. The method of claim 4, wherein
    another angular range is covered by the first set of intra prediction directions; and
    the one of the first set of intra prediction directions is outside the angular range covered by the second set of intra prediction directions.

7. The method of claim 4, wherein a number of the first set of intra prediction directions not included in the second set of intra prediction directions is equal to a number of the second set of intra prediction directions not included in the first set of intra prediction directions.

8. The method of claim 1, wherein a number of intra prediction modes used for the second set of intra prediction directions for the square block is equal to a number of intra prediction modes used for the first set of intra prediction directions for the non-square block.

9. The method of claim 2, wherein the one of the second set of intra prediction directions is based on a shape of the non-square block.

10. The method of claim 2, wherein the one of the second set of intra prediction directions is based on an aspect ratio of the non-square block.

11. An apparatus, comprising processing circuitry configured to:
    decode at least one syntax element from a coded video bitstream, the at least one syntax element indicative of a block size of a non-square block under reconstruction that has a rectangular shape, the block size including a first size in a first dimension and a second size in a second dimension, the first size being different from the second size;
    determine a first set of intra prediction directions for the non-square block based on the block size and from a second set of intra prediction directions for a square block, the first set of intra prediction directions including a first angular subrange of the second set of intra prediction directions and not including a second angular subrange of the second set of intra prediction directions, and each of the second set of intra prediction directions being included in one of the first angular subrange and the second angular subrange; and
    predict a sample of the non-square block based on the first set of intra prediction directions for the non-square block.

12. The apparatus of claim 11, wherein the first set of intra prediction directions does not include one of the second set of intra prediction directions that corresponds to an end of an angular range covered by the second set of intra prediction directions, the end of the angular range being an end of the second angular subrange.

13. The apparatus of claim 12, wherein intra prediction modes used for the first set of intra prediction directions do not include an intra prediction mode used for the one of the second set of intra prediction directions.

14. The apparatus of claim 12, wherein an intra prediction mode used for the one of the second set of intra prediction directions is assigned to one of the first set of intra prediction directions, the one of the first set of intra prediction directions not being included in the second set of intra prediction directions.

15. The apparatus of claim 14, wherein
    another angular range is covered by the first set of intra prediction directions; and
    the one of the first set of intra prediction directions is outside the angular range covered by the second set of intra prediction directions.

16. The apparatus of claim 14, wherein a number of the first set of intra prediction directions not included in the second set of intra prediction directions is equal to a number of the second set of intra prediction directions not included in the first set of intra prediction directions.

17. The apparatus of claim 11, wherein a number of intra prediction modes used for the second set of intra prediction directions for the square block is equal to a number of intra prediction modes used for the first set of intra prediction directions for the non-square block.

18. A non-transitory computer-readable storage medium storing a program executable by at least one processor to perform:
  decoding at least one syntax element from a coded video bitstream, the at least one syntax element indicative of a block size of a non-square block under reconstruction that has a rectangular shape, the block size including a first size in a first dimension and a second size in a second dimension, the first size being different from the second size;
  determining a first set of intra prediction directions for the non-square block based on the block size and from a second set of intra prediction directions for a square block, the first set of intra prediction directions including a first angular subrange of the second set of intra prediction directions and not including a second angular subrange of the second set of intra prediction directions, and each of the second set of intra prediction directions being included in one of the first angular subrange and the second angular subrange; and
  predicting a sample of the non-square block based on the first set of intra prediction directions for the non-square block.

19. The apparatus of claim 14, wherein in a combined angular range covered by the first set of intra prediction directions and the second angular subrange, the one of the first set of intra prediction directions corresponds to a first end of the combined angular range, and the second angular subrange includes a second end of the combined angular range, the second end being the end of the angular range covered by the second set of intra prediction directions.

20. The apparatus of claim 12, wherein the one of the second set of intra prediction directions is based on a shape of the non-square block.

21. The apparatus of claim 11, wherein the intra prediction directions that are included in both the first set of intra prediction directions and the second set of intra prediction directions are a plurality of adjacent intra prediction directions in the second set of intra prediction directions.

* * * * *